United States Patent
Kathail et al.

(10) Patent No.: US 6,952,703 B1
(45) Date of Patent: Oct. 4, 2005

(54) SUBSYSTEM APPLICATION NOTIFICATION METHOD IN A CENTRALIZED ROUTER DATABASE

(75) Inventors: Pradeep K. Kathail, Sunnyvale, CA (US); Carl Sutton, Palo Alto, CA (US); Andrew Valencia, Vashon, WA (US); Joel Bion, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,308

(22) Filed: Oct. 12, 1999

(51) Int. Cl.[7] .............................................. G06F 7/00
(52) U.S. Cl. ................... 707/102; 707/10; 707/205; 709/220; 709/221; 709/223; 709/238; 709/242
(58) Field of Search ........................ 707/10, 205, 102; 709/220, 223, 238, 221, 242

(56) References Cited

U.S. PATENT DOCUMENTS

| | | | |
|---|---|---|---|
| 5,257,368 A | 10/1993 | Benson et al. | |
| 5,452,459 A | 9/1995 | Drury et al. | |
| 5,485,455 A | 1/1996 | Dobbins et al. | ............. 370/60 |
| 5,509,123 A | 4/1996 | Dobbins et al. | |
| 5,689,701 A | 11/1997 | Ault et al. | |
| 5,909,686 A | 6/1999 | Muller et al. | ............... 707/104 |
| 5,951,649 A | 9/1999 | Dobbins et al. | ............. 709/238 |
| 5,963,540 A | 10/1999 | Bhaskaran | .................. 370/218 |
| 5,995,628 A | 11/1999 | Kitaj et al. | |
| 6,018,739 A | 1/2000 | McCoy et al. | .............. 707/102 |
| 6,021,201 A | 2/2000 | Bakhle et al. | |
| 6,061,692 A * | 5/2000 | Thomas et al. | ............. 707/200 |
| 6,078,963 A * | 6/2000 | Civanlar et al. | ............ 709/238 |
| 6,115,715 A | 9/2000 | Traversat et al. | ........... 707/100 |
| 6,119,129 A | 9/2000 | Traversat et al. | ........... 707/202 |
| 6,226,644 B1 * | 5/2001 | Ciscon et al. | .................. 707/10 |
| 6,233,582 B1 | 5/2001 | Traversat et al. | ........... 707/102 |
| 6,301,613 B1 | 10/2001 | Ahlstrom et al. | ........... 709/220 |
| 6,308,205 B1 * | 10/2001 | Carcerano et al. | .......... 709/221 |
| 6,334,158 B1 | 12/2001 | Jennyc et al. | ............... 709/328 |
| 6,446,093 B2 * | 9/2002 | Tabuchi | ...................... 707/205 |
| 6,532,491 B1 * | 3/2003 | Lakis et al. | ................. 709/223 |

* cited by examiner

*Primary Examiner*—Shahid Alam
*Assistant Examiner*—Hung Pham
(74) *Attorney, Agent, or Firm*—Sierra Patent Group, Ltd.

(57) ABSTRACT

A method and system for notifying router subsystems of configuration changes made to router configuration information which are maintained by a centralized information provider or database system. The centralized database provides registration and unregistration for notification of changes made to the router configuration information. The centralized database further provides router configuration change notifications to subsystems registered to receive such notifications.

10 Claims, 9 Drawing Sheets

SUBSYSTEM APPLICATION NOTIFICATION METHOD IN A CENTRALIZED ROUTER DATABASE

BACKGROUND OF THE INVENTION

1. Field of the Invention

This invention pertains generally to internetwork router operating systems. More particularly, the invention is a method and system for carrying out router configuration notifications using a centralized database system.

2. The Prior Art

In a routing device, internetwork operating systems (IOS) or more commonly, router operating systems (OS), provide the basic command functions for the routing device as well as various subsystem components which provide specific functions or routines provided by the routing device.

In general, routing devices carry out the operation of reliably transferring network messages or packets between a network of coupled devices, or a collection of such networks. A reliable transfer protocol is provided by the IOS for carrying out such operation. Additionally, an interface in communication with a Configuration (config) subsystem is provided which allows a user of the routing device to configure the operations of the routing device.

The user may configure, for example, the IP address of a serial interface facility or the default route for the routing device. A config command issued by the user is received by the config subsystem and processed therein. The config subsystem determines from the config command issued by the user which client subsystem is affected by configuration information contained in the config command. The config subsystem then carries out a communication exchange with the affected client subsystem to deliver the change in configuration information.

However, router devices typically include a plurality of client subsystems which manage specific functions, requiring multiple dependencies between the config subsystem and such client subsystems. Furthermore, client subsystems often have multiple dependencies with other client subsystem. For example, the PPP subsystem is dependent upon the IP subsystem for Internet address information and the AAA subsystem for user authentication and credential information. These and other subsystem dependencies as is known in the art prevent modularity in subsystem design and implementation within the IOS of the router.

Another drawback with current subsystem implementation schemes arises when temporary configuration changes to a subsystem are to be carried out. A temporary change is desired when, for example, a user of the routing device wishes to test a particular configuration to analyze the efficiency of such configuration, but would like the opportunity to subsequently revert or "back-out" of the change if desired. During such a configuration sequence, multiple transactions will typically need to be carried out between various subsystems. For example, where a user configures the IP address of a serial facility port, the config subsystem will communicate the new IP address to the IP subsystem. In turn, the IP subsystem will communicate to the PPP subsystem that the serial facility port has new IP address information. When the changes are to be aborted or otherwise reverted, a similar chain of communication is necessary to complete the task of reverting prior changes. Such multiple dependencies between the various subsystems of the IOS make common transactions cumbersome and unnecessarily complicated. Furthermore, design and development of the various subsystems of the IOS must take into account these multiple dependencies requiring longer design and development time.

Another situation where a temporary change is desired is when a user connects to the router via a "dial-in" connection port. Dial-in connections are provided by a plurality of subsystem of the IOS. Certain default settings may be configured for most users. However, specialized settings may be configured for certain users, such as network administrators who have particular access privileges, for example. Where a user connects via a dial-in connection, a dialer subsystem communicates with an AAA subsystem to provide name and password information. Responsive to this communication, the AAA subsystem determines the access credentials of the dial-in user from the name and password information and communicates with a PPP subsystem. The access credentials provide, among other things, the configurations for the user at the dial-in connection port. The PPP subsystem then sets the port configurations for the user according to the user's access credentials thereby enabling point-to-point communication for the user.

When the user disconnects, the PPP subsystem, the AAA subsystem and the dialer subsystem need to communicate with each other to restore default settings. This situation presents another illustration where multiple dependencies between the various subsystems of the IOS make common transactions cumbersome and unnecessarily complicated.

Copending application entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, describes a method and system for transacting routing device configurations using a centralized information provider or database system and is incorporated herein by reference. In this copending application, a centralized database system (sysDB) is within the IOS which manages transactions on router configuration data. The sysDB receives configuration commands from various IOS subsystems. Such commands may include, for example, a request to change configuration data and a request to revert changes made to the configuration data. However, certain subsystems are dependent upon certain configuration data maintained in the database for carrying out their tasks. For example, the IP subsystem is dependent on having IP address configured for a port or interface for the IP subsystem to operate properly.

Accordingly, there is a need for a method and system for carrying out router configuration change notifications to client subsystems which uses a centralized information provider for router configuration information and which does not rely upon multiple dependent subsystems communicating with each other. The present invention satisfies these needs, as well as others, and generally overcomes the deficiencies found in the background art.

An object of the invention is to provide a method and system for carrying out router change configuration notifications which overcomes the prior art.

Another object of the invention is to provide a method and system for carrying out router change configuration notifications using a centralized database.

Another object of the invention is to provide a method and system for carrying out router change configuration notifications which does not require multiple dependencies between subsystem applications of the router.

Another object of the invention is to provide a method and system for carrying out router change configuration notifications which allows the subsystem applications of the router to be modular and independent of each other.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and system for notifying router subsystems of configuration changes made to router configuration information which are maintained by a centralized information provider or database system. The method of the invention is provided by operating system software which is run or otherwise executed on the routing device (router). The method of present invention is implemented by software which is stored on a computer-readable medium, such as computer memory, for example.

In its most general terms, the method of the invention comprises software routines and algorithms which are generally provided as part of an operating system (OS) which is executed in a router device. The operating system software which is also known as internetwork operating system (IOS) comprises a plurality of subsystems, each of which perform functions for the router.

One of the subsystems provided by the IOS is a centralized database system (sysDB). The sysDB executes as a subsystem component in the router and provides a centralized storage and retrieval facility for configuration information required by other subsystems of the IOS. The configuration information stored on the sysDB may include, for example, Internet protocol (IP) addresses, Ethernet configurations, subnet masks, default routes, protocol configuration, name server information, user and password data, access levels, and other router data as is known in the art. As noted above, prior art router implementations have required the individual subsystems to handle storage and retrieval of configuration information related to the corresponding subsystem (i.e., IP subsystems contained IP configuration data, AAA subsytems contained user authentication information). The present invention employs a centralized sysDB which handles storage and retrieval tasks normally assigned to various subsystems. By centralizing such configuration information in a sysDB, multiple dependencies between the other individual subsystem are avoided or greatly reduced. This arrangement allows the subsystem design and implementation to be modular. Subsystems may be added and removed with greater ease due to the lack of multiple and prevalent dependencies.

The sysDB subsystem preferably employs a hierarchical name space scheme in a tree format (sysDB tree) for data storage and retrieval of configuration and other information for the router. Each branch or leaf on the tree is treated as a node or a "tuple". In an illustrative example, the sysDB tree employs a naming convention analogous to the UNIX® file system where intermediate nodes of the tree are analogous to UNIX® directories and where leaf nodes are treated as files and data which are associated with the files. In the preferred embodiment, each node or tuple in the sysDB tree has a pointer to its parent node, a pointer to its next peer, and a pointer to its first child. With this arrangement, all the children of a tuple can be iterated by using the first child as the head of a link list and traversing through the corresponding peer of each child. While the sysDB described above employs a tree structure for data storage and retrieval, other data storage facilities known in the art may be utilized including, for example, a table, btree or relational table scheme without deviating from present invention disclosed herein.

According to a first aspect of the invention, the sysDB carries out the operation of registering subsystem applications for notification for configuration changes made to the router. Subsystem applications may register for notification for configuration data at one or more tuples within the sysDB tree maintained by the sysDB. Subsystems may also register for notification of a "name space" or sub-tree of a tuple, wherein changes to the configuration data within all the child nodes of a selected tuple are also provided during notification. More than one subsystem may register for the same tuple. The sysDB also carries out the operation of unregistering subsystem applications for notification. Once a subsystem is unregistered with the sysDB, the subsystem will no longer receive router change notifications.

According to a second aspect of the invention, the sysDB uses an OS event delivery mechanism to deliver router change information to the registered subsystems. In operation, when the sysDB ascertains that a change has been made to a configuration data maintained at a tuple in the sysDB tree, the sysDB delivers the changed configuration data to subsystem applications registered to receive such information. Change events which trigger a notification may include, for example, a router configuration change, delete, add, or revert.

The sysDB subsystem is operatively coupled to the other subsystems of the IOS for receiving registration and unregistration requests and for providing notification services, among other things. An illustrative IOS may include an Internet protocol (IP) subsystem, an Ethernet subsystem, a dialer subsystem, a point-to-point (PPP) subsystem, an authentication (AAA) subsystem, and a config subsystem, each subsystem operatively coupled to the sysDB subsystem, but not coupled to each other.

The method and system for carrying out router configuration transactions using the centralized database (sysDB) are described in detail in copending application entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999 and is incorporated herein by reference.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
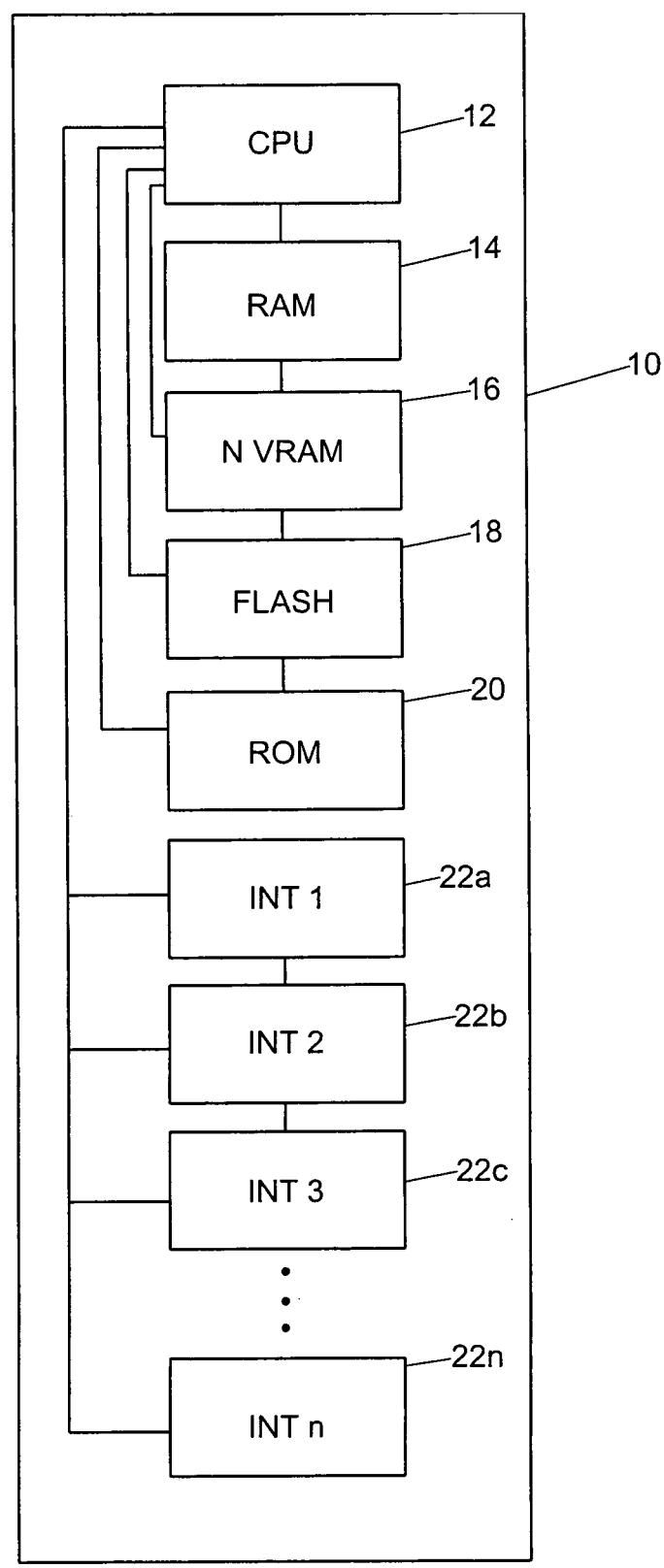
FIG. 1 is a block diagram of a router device suitable for use with the present invention.
Figure 2:
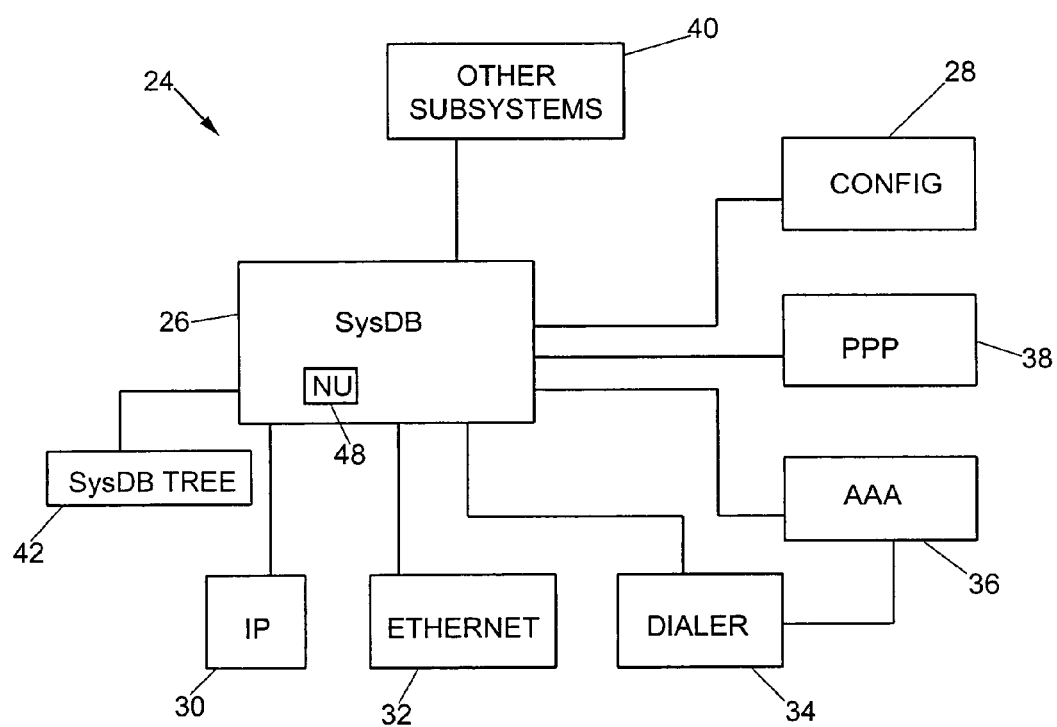
FIG. 2 is a block diagram of an internetwork operating system in accordance with the present invention.
Figure 3:
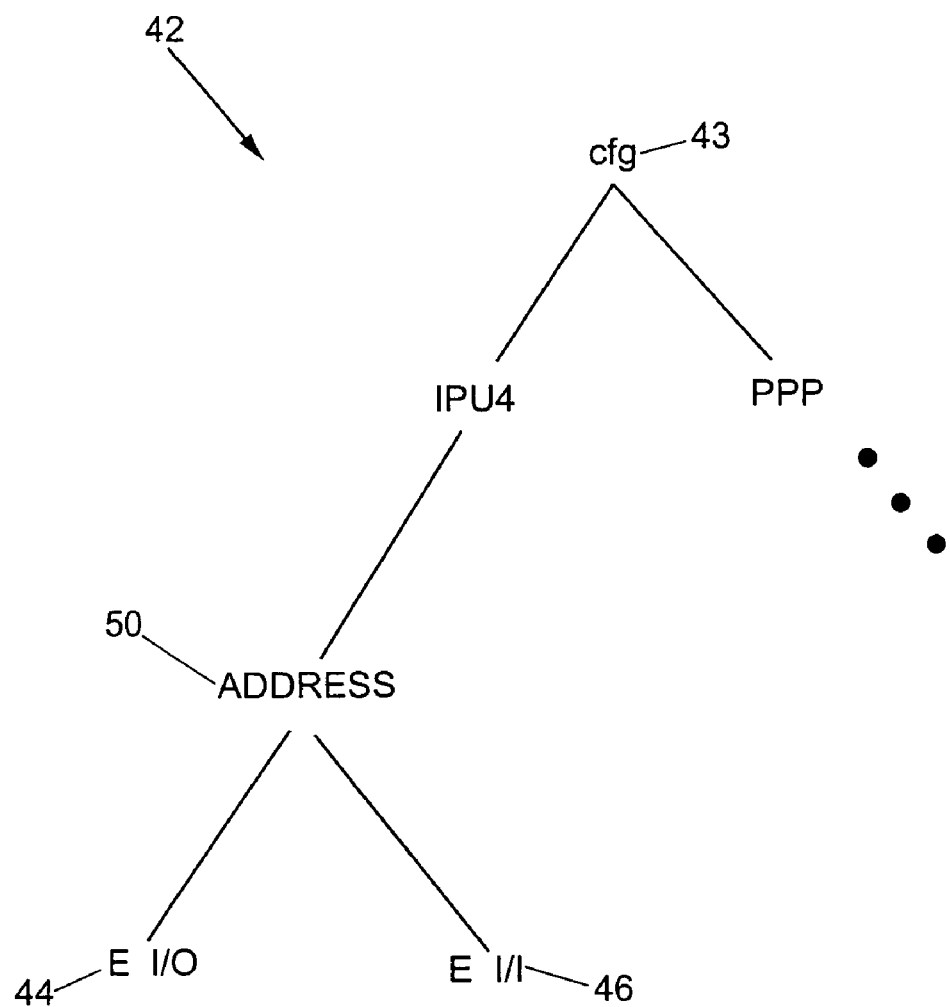
FIG. 3 is a block diagram of an exemplary tree structure for data storage suitable of use with the present invention.

Referring more specifically to the drawings, for illustrative purposes the present invention is embodied in the apparatus shown FIG. 1 through FIG. 3 and the method outlined in FIG. 4 through FIG. 9. It will be appreciated that the apparatus may vary as to configuration and as to details of the parts, and that the method may vary as to details and the order of the steps, without departing from the basic concepts as disclosed herein. The invention is disclosed generally in terms of a method and system for carrying out router configuration notifications, although numerous other uses for the invention will suggest themselves to persons of ordinary skill in the art.

Referring first to FIG. 1, there is shown generally a block diagram of a router device 10 suitable for use with the present invention. The router device 10 includes circuitry or like hardware components well known by those in the art and comprises a CPU 12, random access memory (RAM) 14 operatively coupled to the CPU 12, non-volatile memory (NVRAM) 16 operatively coupled to the CPU 12, flash memory (FLASH) 18 operatively coupled to the CPU 12, read-only memory (ROM) 20 operatively coupled to the CPU 12.

The router device 10 further includes a plurality of interface facilities (INT) 22a through 22n, each of which are operatively coupled to the CPU 12. The interface facilities (INT) 22a through 22n comprise typical ports known in the art which connect to external input/output (I/O) devices. For example, INT 22a may comprise a console port, INT 22b may comprise an Ethernet port, INT 22c may comprise an auxiliary port, and INT 22d may comprise a serial port. Various other port configurations as is known in the art may be arranged without deviating from the present invention.

The CPU 12 carries out the computational tasks associated with executing and running the internetwork operating system (IOS) software of the present invention and comprises circuitry or other hardware as is known in the art. In one exemplary embodiment, the CPU 12 comprises a MIPS R4000 CPU.

The RAM 14 may comprise random access memory or dynamic random access memory. The RAM 14 provides the main storage component for the router 10. The RAM 14 is also referred to as working storage and contains the running configuration information of the router which is managed by the system database (sysDB) as described in further detail below. RAM 14 is volatile memory as is lost when power is interrupted to the router 10.

The NVRAM 16 normally contains a persistent copy of the configuration information of the router. The configuration information includes, among other things, statements about router-specific attributes, protocol functions, and interface addresses. If power is interrupted to the router 10, the persistent copy of the configuration is provided to the router to provide normal routing operation without the need for reprogramming or reconfiguring.

The FLASH 18 is an erasable, programmable read-only memory which contains the internetwork operating system (IOS) software of the router 10. As is known in the art, flash memory has a structure that enables the flash to store multiple copies of the IOS software. Flash memory content is retained when power is interrupted from the router or the router is restarted.

The ROM 20 contains an initializing bootstrap program and is used during initial start up of the router 10. The ROM 20 usually carries out a power-on self-test (POST) to check the hardware components of the router 10 as is known in the art.

During start up, the router 10 conducts the POST check routine which is provided by the ROM 20. The POST check includes a diagnostic which verifies the basic operation of the CPU 12, the RAM 14, the NVRAM 16, the FLASH 18, and interface circuitry 22a through 22n. At the conclusion of the POST, the router 10 loads the IOS software from the FLASH 18 into the RAM 14. It will be appreciated that IOS software may be loaded using a variety of methods without deviating from the present invention including, for example, loading the IOS from an external source such as a TFTP server. The router configuration information is then loaded into RAM 14 from the NVRAM 16. More particularly, the configuration information is loaded into the database server in RAM 14. The configuration information for the router may also be loaded into RAM 14 using other means known in the art. The CPU 12 then proceeds to carry out the tasks required by the IOS.

Referring next to FIG. 2, there is shown a block diagram of an internetwork operating system (IOS) 24 in accordance with the present invention. The IOS 24 which is stored in the FLASH 18 provides the software functions and routines executed by the CPU 12 for the router device 10. The method of the present invention is preferably incorporated into the IOS software device and is executed by the CPU 12. FIG. 3 depicts a block diagram of an exemplary tree structure 42 for data storage which is used in conjunction with the IOS 24 as described herein.

The IOS 24 comprises a plurality of subsystem applications which are executed by the CPU 12 and are loaded and resident in RAM 14. The IOS 24 includes a system database (sysDB) 26 subsystem, a config subsystem 28 coupled to the sysDB 26, an Internet Protocol (IP) subsystem 30 coupled to the sysDB 26, an Ethernet subsystem 32 coupled to the sysDB 26, a dialer subsystem 34 coupled to the sysDB 26, an authentication (AAA) subsystem 36 coupled to the sysDB 26, and a point-to-point protocol (PPP) subsystem 38 coupled to the sysDB 26. It will be appreciated that the configuration shown for IOS 24 is only exemplary and various arrangements of subsystems as known in the art may be used with the method of the present invention. Thus, other subsystems 40 may be coupled to the sysDB 26 to provide additional functions. For example, a SONET subsystem may be coupled to the sysDB 26 to provide optical services.

The sysDB 26 manages a centralized database coupled therewith which is shown and generally designated as sysDB tree 42. The centralized database (sysDB tree 42) may comprise any data storage structure known in the art, and is preferably structured and configured as a tree format (FIG. 3). The sysDB tree 42 contains the running router configuration information used by the various subsystems to carry out their respective tasks.

The sysDB tree structure includes a plurality of branches and leaves which stem from the root configuration (cfg) 43, wherein each branch or leaf is treated as a node or "tuple". For example, FIG. 3 shows a portion of a sysDB tree 42 which includes seven (7) tuples for accommodating router configuration data. For example, Ethernet (E) 1/0 tuple 44 contains Internet address information for Ethernet Port 0 (not shown), and Ethernet (E) 1/1 tuple 46 contains Internet address information for Ethernet Port 1 (not shown). Each tuple includes a first "current" field for storing a current or "default" value associated with configuration information related to the tuple and a second "old" field for storing an "old" configuration value for the tuple. As described further below, the "old" field at a tuple will contain a value when a transaction is currently active on that tuple. When the "old" field value is empty or NULL at a tuple, a transaction is not associated with that tuple. In certain cases, a plurality of values may be stored at a given tuple by providing an array of fields wherein each field of the array may accommodate a certain value. Other data structures for storing data at a tuple may also be implemented at a tuple without deviating from the present invention. For example, a tuple may include a pointer that points to an external data store which contains the value for the tuple.

In the preferred embodiment, each node or tuple in the sysDB tree has a pointer to its parent node, a pointer to its next peer, and a pointer to its first child. Thus, E 1/0 tuple 44 has a pointer to Address tuple 50 and to E 1/1 tuple 46. With this arrangement, all the children of a tuple can be iterated by using the first child as the head of a link list and traversing through the corresponding peer of each child.

The sysDB 26 further includes an iterating function for navigating to a particular tuple within the sysDB tree 42. A tuple iterator is created for traversing the sysDB tree 42 and is destroyed after completion of its traversal operation. Preferably a tuple iterator does not lock any of the tuples over which it traverses. The sysDB 26 further includes a notification unit (NU) 48 for carrying out notification tasks which are described in more detail in conjunction with FIG. 4 through FIG. 9. The sysDB 26 includes other functions (not shown) related to carrying out transactional and verification tasks.

The config subsystem 28 carries out the operation of receiving configuration commands for a user of the router, executing the configuration command received from the user and providing configuration information to the user of the router upon request from the user. As described above, this router configuration information is stored and managed by the sysDB 26 in the sysDB tree 42.

The IP subsystem 30 carries out the operation of providing wide-area connectivity using a set of protocols associated with Internet Protocol (IP). As is known in the art, the IP subsystem provides packet filtering and forwarding functions for the IP protocol.

A connector device (not shown) may be provided as one of the interface facilities 22a through 22n to connect Ethernet facilities to the router 10. The Ethernet subsystem 32 carries out the operation of providing packet filtering based on Ethernet MAC (Layer 2) or IP (Layer 3) addresses as is known in the art and packet forwarding as is known in the art.

The dialer subsystem 34 carries out the operation of providing dial-in connection services to a user of the router. To this end, the dialer subsystem initiates terminal reception of a user's access credentials, normally in the form of a name and a password.

The AAA subsystem 36 carries out the operation of authenticating the access credentials of users of the router. The AAA subsystem 36 verifies the name and password of the user, which is obtained from the dialer subsystem 34 and determines configuration data for the user as well as access privileges. Configuration data may include such information as the user's IP address, for example. The configuration data for the user is stored in the sysDB tree 42 by sysDB 26 via a transaction request from the AAA subsystem 36.

The PPP subsystem 38 carries out the operation of providing Point-to-Point protocol services over a point-to-point link. As an aspect of providing Point-to-Point protocol services, the PPP subsystem 38 provides a method of encapsulating multi-protocol datagrams into an encapsulated protocol, provides a Link Control Protocol (LCP) which establishes, configures and test the point-to-point link, and provides a Network Control Protocol (NCP) using the encapsulated protocol, which is normally IP.

In operation, the various subsystem applications 28 through 40 may register to be notified of changes to configuration data maintained in the sysDB tree 42 by the sysDB subsystem 26. During the registration, the subsystem identifies which tuple the subsystem would like notification. The system may also identify a name space (i.e., the sub-tree of a tuple) for which the subsystem would like notification.

Once a subsystem application has been registered for notification, the sysDB 26 will notify such registered subsystem of changes made within the tuples or the name space for which the subsystem has registered. Transactions made within the tuples that trigger notification include, for example, tuple create requests, tuple delete requests, tuple modification requests, and tuple reversion requests.

A subsystem may also unregister with the sysDB 26. When the sysDB 26 receives an unregister request from a subsystem, the sysDB 26 removes the registration notification for that subsystem. Once a subsystem is unregistered, the sysDB 26 will no longer notify such subsystem of router configuration changes.

Figure 4:
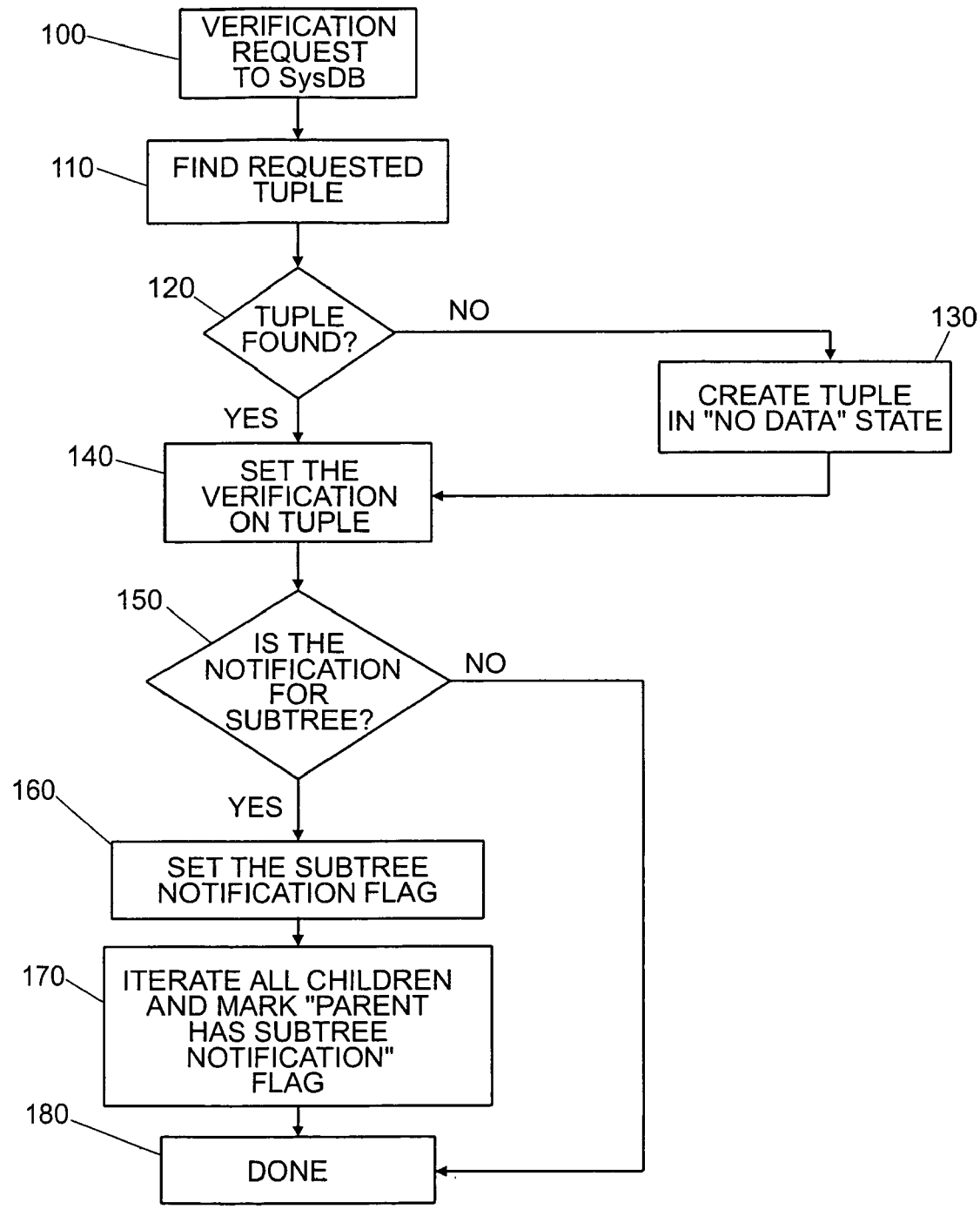
FIG. 4 is a flow chart showing generally the steps involved in registering a subsystem application for notification.
Figure 5:
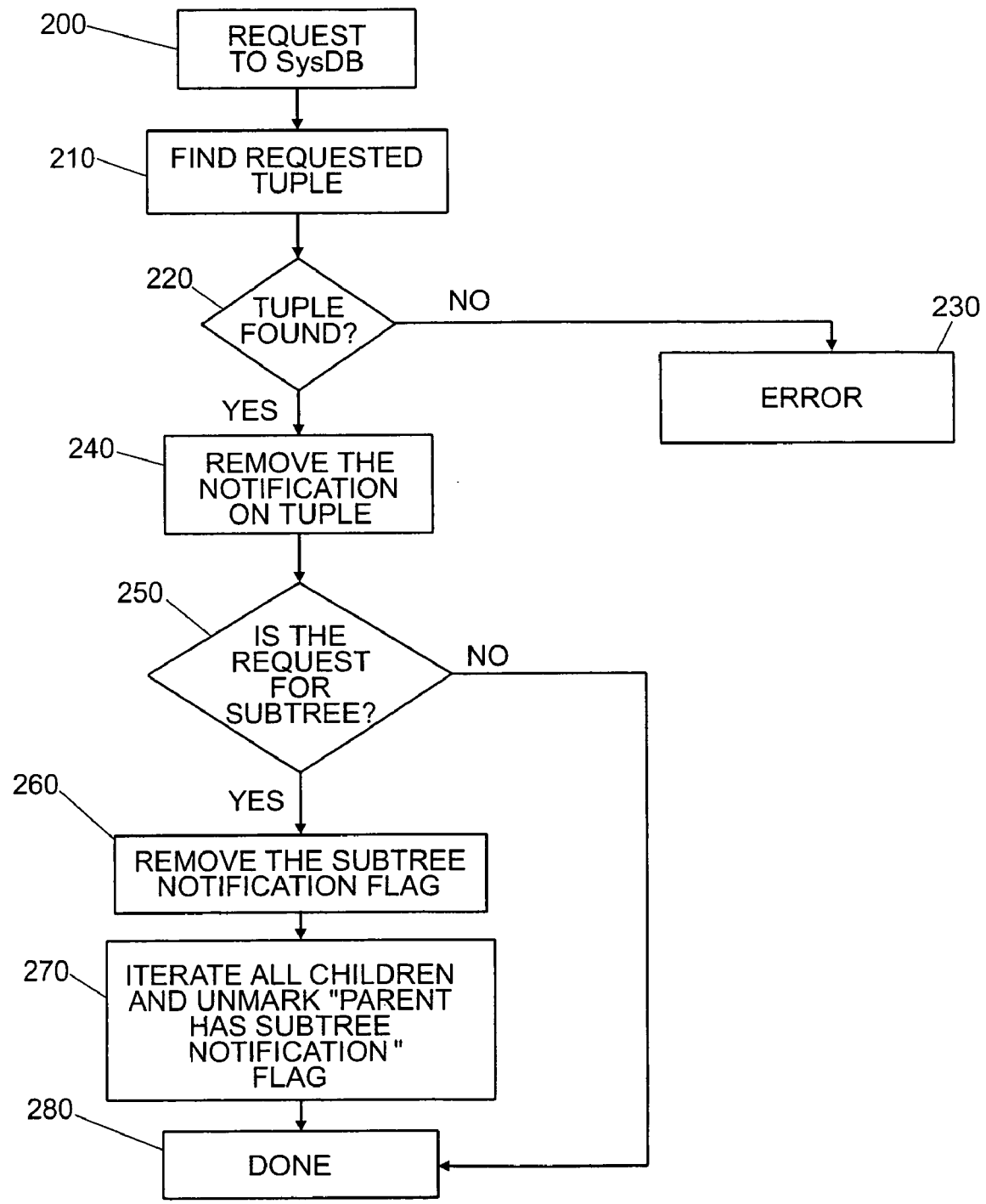
FIG. 5 is a flow chart showing generally the steps involved in unregistering a subsystem application from notification.
Figure 6:
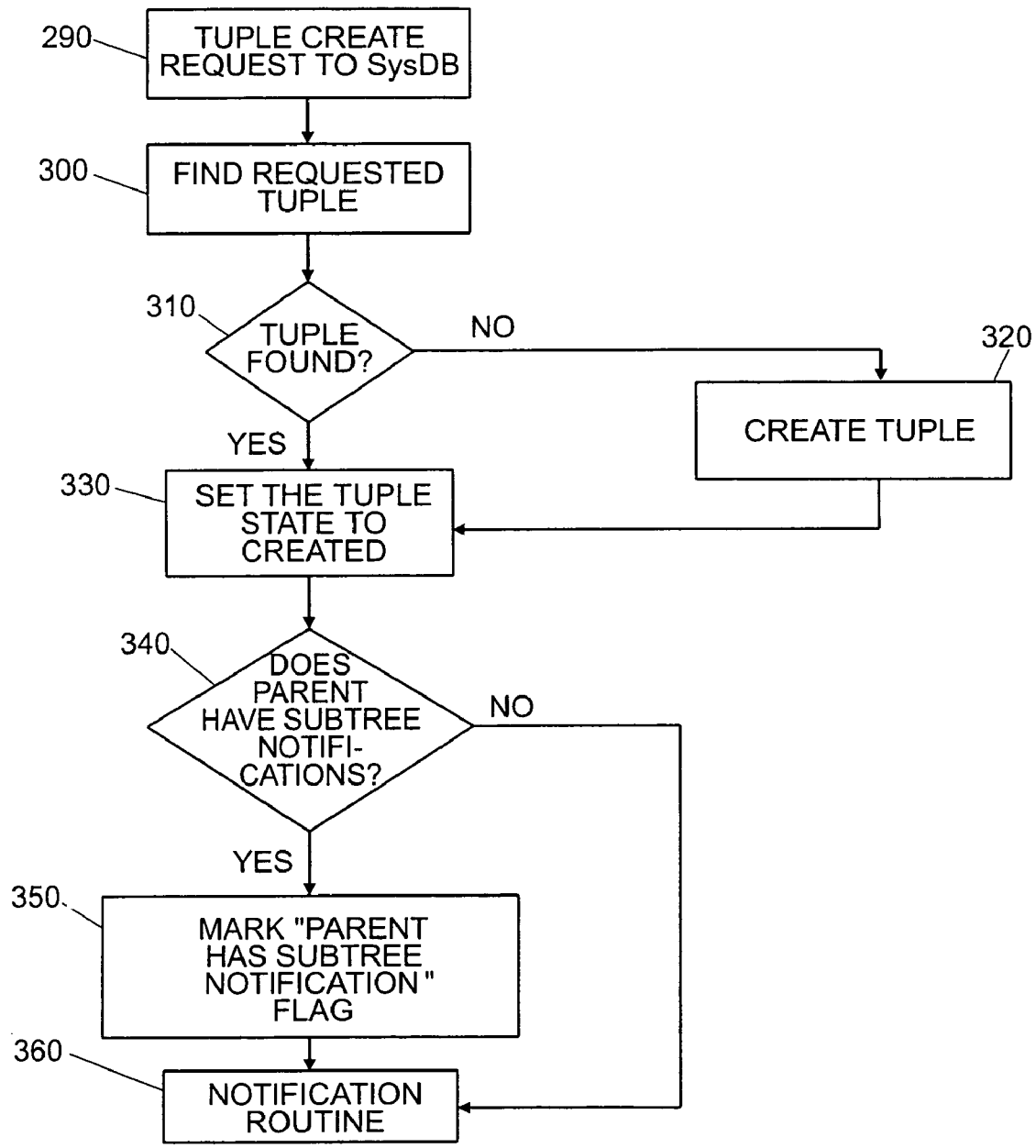
FIG. 6 is a flow chart showing generally the steps involved in notifying a subsystem application during a tuple create event.
Figure 7:
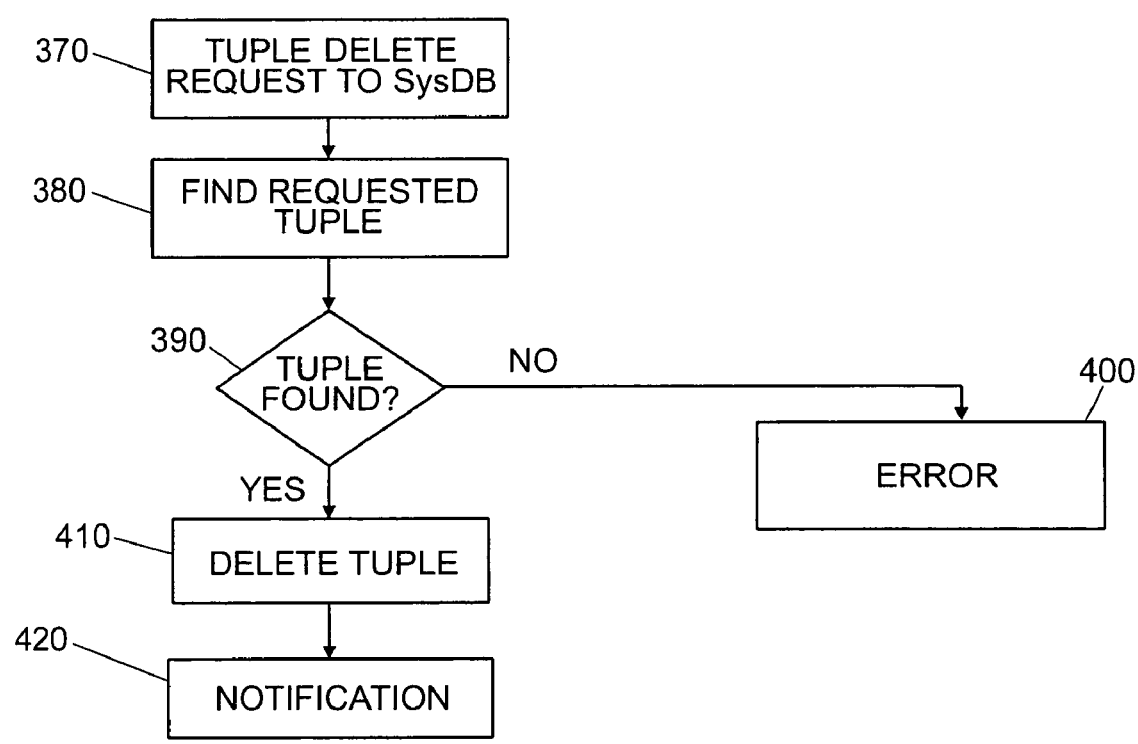
FIG. 7 is a flow chart showing generally the steps involved in notifying a subsystem application during a tuple delete event.
Figure 8:
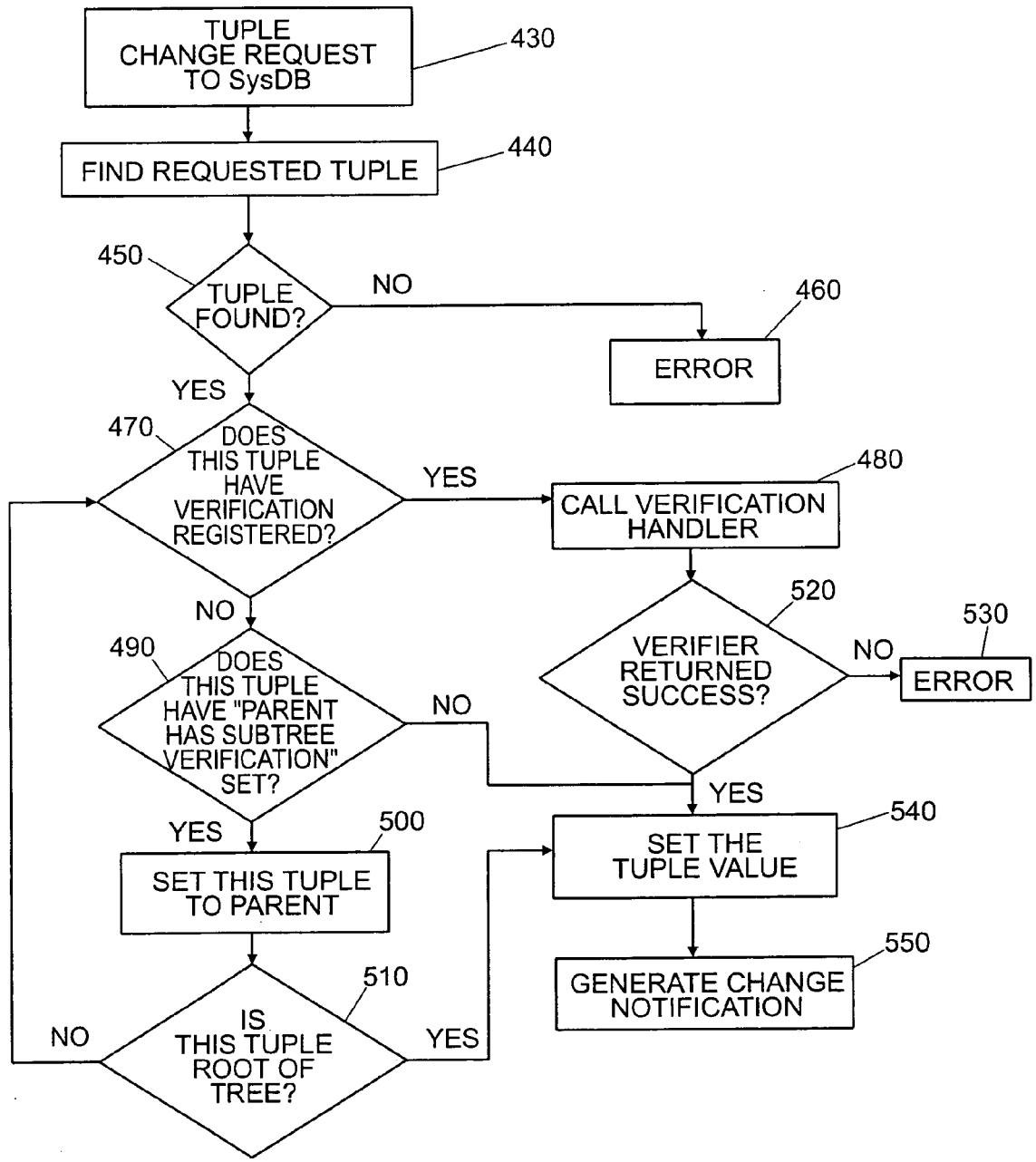
FIG. 8 is a flow chart showing generally the steps involved in notifying a subsystem application during a tuple change event.
Figure 9:
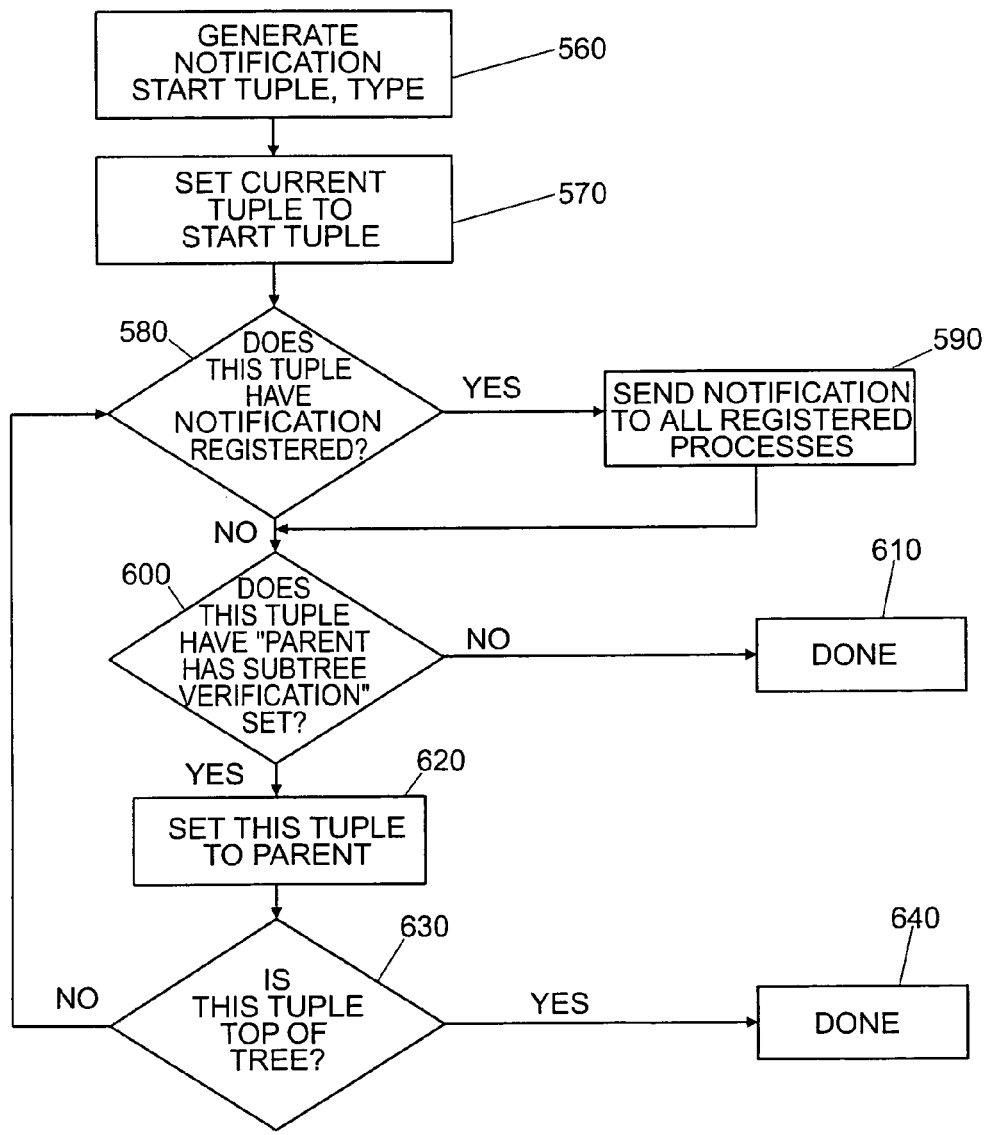
FIG. 9 is a flow chart showing generally the steps involved in generating notification to subsystem applications.

The method and operation of invention will be more fully understood with reference to the flow charts of FIG. 4 through FIG. 9, as well as FIG. 1 through FIG. 3. FIG. 4 is a flow chart showing generally the steps involved in registering a subsystem application for notification. FIG. 5 is a flow chart showing generally the steps involved in unregistering a subsystem application from notification. FIG. 6 is a flow chart showing generally the steps involved in notifying a subsystem application during a tuple create event. FIG. 7 is a flow chart showing generally the steps involved in notifying a subsystem application during a tuple delete event. FIG. 8 is a flow chart showing generally the steps involved in notifying a subsystem application during a tuple change event. FIG. 9 is a flow chart showing generally the steps involved in generating notification to subsystem applications. The order of steps as shown in FIG. 4 through FIG. 9 and described below are only exemplary, and should not be considered limiting.

Referring now to FIG. 4, as well as FIG. 1 through FIG. 3, there is shown generally the steps of registering a subsystem for notification. A subsystem may request to be notified of changes made to the configuration data stored in the sysDB tree 42. For example, the PPP subsystem will request notification of changes to IP addresses on any serial interface.

At step 100, a subsystem issues a registration request to the sysDB 26 for notification. This request will indicate, among other things, the configuration data (tuple) for which the subsystem is requesting notification and whether the subsystem is requesting notification for a "name space" which includes the sub-tree data associated with the tuple. Step 110 is then carried out.

At step 110, the sysDB 26 receives the registration request of step 100. In response to this request, the sysDB 26 calls a tuple iterator function to find the location of the tuple for which notification is requested. The iterator function searches the sysDB tree 42 starting at the root (cfg) 43 to ascertain the location of the requested tuple. Step 120 is then carried out.

At step 120, the iterator function determines whether the requested tuple was found during the search of step 110. If the tuple is not found, step 130 is carried out. Otherwise, step 140 is carried out.

At step 130, the iterator function was not able to find the requested tuple in the sysDB tree 42. The absence of a tuple indicates that data for that tuple currently is not available. However, since some of the configuration data maintained in the sysDB 26 is generated dynamically during the operation of the router, the tuple may contain configuration data at some later time during the operation of the router. At this step, a tuple is created in the sysDB tree 42 for which the present notification registration request is associated with. The value for this newly created tuple is set to a "no data" state. Creation of the tuple is necessary during this step to accommodate the registration of notification, although the configuration value for the tuple may be defined at some later time. Step 140 is then carried out.

At step 140, the sysDB 26 registers the notification for the requested tuple. The sysDB 26 indicates at the requested tuple which subsystem will be notified in the event of a change of configuration data associated with the tuple. As noted, one or more subsystems may register for notification one or more of the tuples of the sysDB tree 42. Thus each tuple of the sysDB tree 42 may register one or more router subsystems for notification. Step 150 is then carried out.

At step 150, the sysDB 26 determines whether the request of step 100 was a registration request for a name space (sub-tree) of a tuple. Where a subsystem registers for notification of a name space, the registered subsystem will be notified of configuration changes made at the requested tuple as well as configuration changes made at the children nodes of the requested tuple. If the registration request was for a name space of the requested tuple, step 160 is carried out. Otherwise, step 180 is carried out.

At step 160, the subsystem has requested notification of a name space. Responsive to this request, the sysDB 26 sets the sub-tree notification flag for the requested tuple. This flag indicates that when a change is made at any of its child tuples of the requested tuple, that notification will be made to the requesting subsystem. Step 170 is then carried out.

At step 170, the sysDB 26 iterates through each child tuple of the requested tuple to set its "parent has sub-tree notification" flag. This flag indicates that when a change or update is made at the child tuple level, notification at a parent tuple is to be made to a requesting subsystem. This flag will also be set for child tuples created at a later time which are child tuples of the requested tuple.

At step 180, the registration is completed. The sysDB 26 will transmit an acknowledgment to the requesting subsystem to indicate that its registration for notification was successful.

Referring next to FIG. 5, as well as FIG. 1 through FIG. 3, there is shown generally the steps of unregistering a subsystem from notification. Once a subsystem is unregistered with the sysDB 26, the subsystem no longer receives change notification for the tuple for which unregistration is requested.

At step 200, a subsystem issues an unregistration request to the sysDB 26. This request indicates the tuple for which unregistration is requested. The subsystem may unregister with one tuple or name space and maintain notification registration with other tuples or name spaces.

At step 210, the sysDB 26 receives the unregistration request of step 200. In response to this request, the sysDB 26 calls a tuple iterator function to find the location of the tuple for which unregistration is requested. The iterator function searches the sysDB tree 42 starting at the root (cfg) 43 to ascertain the location of the requested tuple. Step 220 is then carried out.

At step 220, the iterator function determines whether the requested tuple was found during the search of step 210. If the tuple is not found, step 230 is carried out. Otherwise, step 240 is carried out.

At step 230, the iterator function was not able to find the requested tuple in the sysDB tree 42. The absence of a tuple for unregistration is interpreted as an error because unregistration is proper only when a prior registration was made. Since the iterator function did not find the requested tuple, the unregistration request is improper and an error message is displayed to the user to indicate an unregistration error.

At step 240, the sysDB 26 removes the notification registration for the requested tuple. Once notification registration is removed or otherwise deleted, the requesting subsystem of step 200 will not receive future change notifications for the requested tuple. Step 250 is then carried out.

At step 250, the sysDB 26 determines whether the request of step 200 was an unregistration request for a name space (sub-tree) of the requested tuple. As noted above, where a subsystem registers for notification of a name space, the registered subsystem will be notified of configuration changes made at the requested tuple as well as configuration changes made at the children nodes of the requested tuple. Similarly, if unregistration is requested for a name space, notification for changes made at children nodes of the requested tuple must also be removed. If the unregistration request was for a name space of the requested tuple, step 260 is carried out. Otherwise, step 280 is carried out.

At step 260, the sysDB 26 removes the sub-tree notification flag for the requested tuple. Removal of this flag indicates that the requested tuple no longer receives notification of changes made at any of its child tuples. Step 270 is then carried out.

At step 270, the sysDB iterates through each child tuple of the requested tuple to remove its "parent has sub-tree notification" flag. Once removed, notification of changes made at any of the child tuples will not be made to its parent tuple. Step 280 is then carried out.

At step 280, the unregistration is complete. The sysDB 26 will transmit an acknowledgment to the requesting subsystem to indicate that its unregistration was successful.

As described above, changes made within the tuples of database tree 42 that trigger notification include, for example, tuple create requests, tuple delete requests, tuple modification requests, and tuple reversion requests. Referring now to FIG. 6, as well as FIG. 1 through FIG. 3, there is shown generally the steps of notifying a subsystem application during a tuple create event. A create tuple event occurs when a subsystem issues a create tuple request with the sysDB 26.

At step 290, a subsystem issues a create tuple request to the sysDB 26. Since the configuration data maintained in the sysDB tree 42 is dynamically created during the execution of the router, a subsystem may request a tuple to be created during the operation of the router. For example, the config subsystem 28 may issue a command to define the IP address of an interface. In this case, a request is made to create a tuple for the IP address for the interface. Step 300 is then carried out.

At step 300, the sysDB 26 receives the create tuple request of step 290 and ascertains the location of the tuple in the sysDB tree 42. The sysDB 26 calls a tuple iterator function to find the location of the tuple for which creation is requested. The iterator function searches the sysDB tree 42 starting at the root (cfg) 43 to ascertain the location of the requested tuple. Step 310 is then carried out.

At step 310, the iterator function determines whether the requested tuple was found during the search of step 300. In certain cases, a tuple may have already been created by another process. For example, the steps for registering for change notification describe a tuple creation step in conjunction with FIG. 4. If the tuple is not found, step 320 is carried out. Otherwise, step 330 is carried out.

At step 320, the sysDB 26 creates a tuple node in the sysDB tree 42 for the requested tuple of step 290. Step 330 is then carried out.

At step 330, the sysDB 26 sets the tuple state to "created" and stores the value for the configuration data with the tuple. The "created" state indicates that the tuple has been created and that the tuple has configuration data. Step 340 is then carried out.

At step 340, the sysDB 26 inspects the parent tuple of the newly created tuple of step 330 to ascertain whether the parent tuple has its sub-tree notification flag set. If the parent tuple has its sub-tree notification flag set, notification to requesting subsystem(s) registered at the parent tuple is appropriate. If the parent tuple has its sub-tree notification flag set, step 350 is carried out. Otherwise step 360 is carried out.

At step 350, the sysDB 26 has determined that the parent tuple of the newly created tuple of step 330 has its sub-tree notification flag set. The sysDB 26 sets its "parent has sub-tree notification" flag to indicate that when a change is made at this child tuple, its parent tuple is to be notified of changes made. Step 360 is then carried out.

At step 360, the sysDB 26 executes the notification routine as described below in conjunction with FIG. 9. As described in further detail below, the notification routine determines whether notification to registered subsystems will be carried out at this tuple and/or its parent tuple.

Referring now to FIG. 7, as well as FIG. 1 through FIG. 3, there is shown generally the steps of notifying a subsystem application during a tuple delete event. A delete tuple event occurs when a subsystem issues a delete tuple request with the sysDB 26.

At step 370, a subsystem issues a delete tuple request to the sysDB 26. Configuration data may be deleted in a variety of situations as is known in the art. For example, when a user unconfigures the IP protocol of an interface (serial, for example) the IP address of that interface will be deleted by the config subsystem 28. Step 380 is then carried out.

At step 380, the sysDB 26 receives the delete tuple request of step 370 and ascertains the location of the tuple in the sysDB tree 42. The sysDB 26 calls a tuple iterator function to find the location of the tuple for which deletion is requested. The iterator function searches the sysDB tree 42 starting at the root (cfg) 43 to ascertain the location of the requested tuple. Step 390 is then carried out.

At step 390, the iterator function determines whether the requested tuple was found during the search of step 380. If the tuple is not found, step 400 is carried out. Otherwise, step 410 is carried out.

At step 400, the iterator function was not able to find the requested tuple in the sysDB tree 42. The absence of a tuple for deletion is interpreted as an error because deletion is proper only if the tuple was previously created. Since the iterator function did not find the requested tuple, the deletion request is improper and an error message is displayed to the user to indicate a deletion error.

At step 410, the configuration data associated with the requested tuple is deleted, and the tuple is set in the "no data" data. Normally, the tuple or node is not actually deleted or purged from the sysDB tree 42, but rather its configuration data contents are purged or otherwise deleted. Step 420 is then carried out.

At step 420, the sysDB 26 executes the notification routine as described below in conjunction with FIG. 9. If registration for notification is made for the deleted tuple, notification of the present deletion will be carried out to subsystems registered for notification.

Referring now to FIG. 8, as well as FIG. 1 through FIG. 3, there is shown generally the steps of notifying a subsystem application during a tuple change or modification event. A change tuple event occurs when a subsystem issues a configuration data change with the sysDB 26. Configuration changes to a router device is common as is known in the art and may include, for example, changes to IP addresses, subnet masks, and other protocol parameters.

At step 430, a subsystem issues a change tuple request to the sysDB 26. Step 440 is then carried out.

At step 440, the sysDB 26 receives the change tuple request of step 430 and ascertains the location of the tuple in the sysDB tree 42. The sysDB 26 calls a tuple iterator function to find the location of the tuple for which a change is requested. The iterator function searches the sysDB tree 42 starting at the root (cfg) 43 to ascertain the location of the requested tuple. Step 450 is then carried out.

At step 450, the iterator function determines whether the requested tuple was found during the search of step 440. If the tuple is not found, step 460 is carried out. Otherwise, step 470 is carried out.

At step 460, the iterator function was not able to find the requested tuple in the sysDB tree 42. The absence of a tuple for change or update is interpreted as an error because a change of value at a tuple is proper only if the tuple was previously created. Since the iterator function did not find the requested tuple, the change request is improper and an error message is displayed to the user to indicate a change request error.

At step 470, the sysDB 26 determines whether the requested tuple found in step 450 has verification registrations. If a tuple has verification registrations, subsystems, which are registered for "verification" at the tuple, must first authorize changes before such changes are permitted. Verification registrations are described in further detail in copending application entitled METHOD AND SYSTEM FOR VERIFYING CONFIGURATION TRANSACTIONS MANAGED BY A CENTRALIZED DATABASE filed on Oct. 12, 1999 which is expressly incorporated by reference herein. If verification registrations exist at the requested tuple then step 480 is carried out. Otherwise step 490 is carried out.

At step 480, the sysDB 26 determines that the requested tuple has verification registrations. The sysDB 26 then calls the verification handler routine which either authorizes the change request or denies the change request. The verification handle routine is described further in copending application entitled METHOD AND SYSTEM FOR VERIFYING CONFIGURATION TRANSACTIONS MANAGED BY A CENTRALIZED DATABASE filed on Oct. 12, 1999. Step 520 is then carried out.

At step 520, the sysDB 26 receives a reply from the verification handler routine. The verification handler will return a "success" reply for authorized changes, or an "error" reply for unauthorized changes. If a "success" reply is issued, step 540 is carried out to set the tuple value. Otherwise step 530 is carried out to generate an error message.

At step 530, the verification handler returned an "error" in response to proposed changes issued at step 430. An error message is generated and is displayed to the user.

At step 490, the sysDB 26 determines whether the requested tuple has its "parent has sub-tree verification" flag set. If the "parent has sub-tree verification" flag is set, then a subsystem is registered at a parent level to verify changes to a name space which includes the requested tuple before such change is carried out. If the "parent has sub-tree verification" flag is set at the requested tuple, then step 500 is carried out. Otherwise, step 540 is carried out to set the tuple value.

At step 500, the sysDB 26 iterates the sysDB tree 42 to the parent of the currently inspected tuple, to thereby ascertain subsystems, if any, registered for verification at the parent tuple. It will be appreciated that when actually carrying out the verification sequence, described in step 480, the present invention verifies the value(s) provided in the change request of step 430 with such registered subsystems, if any. Step 510 is then carried out.

At step 510, the sysDB 26 determines whether the tuple iterated to in step 500 is the root (cfg) 43 of the sysDB tree 42. Generally, verification registrations are not carried out at the root node. If the currently iterated tuple is the root (cfg) 43 of the sysDB tree 42, step 540 is carried out to set the tuple value. Otherwise step 470 is repeated again to confirm verification at the iterated parent level.

At step 540, the sysDB 26 changes the configuration value for the tuple. In the preferred embodiment, the previous value for the tuple may be stored and may be reverted upon request. Copending application entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, describes in further detail the method for carrying out configuration changes and reversions with a centralized database and is expressly incorporated by reference herein. Step 550 is then carried out.

At step 550, the sysDB 26 executes the notification routine as described below in conjunction with FIG. 9. As described in further detail below, the notification routine determines whether notification to registered subsystems will be carried out at this tuple and/or its parent tuple.

Referring now to FIG. 9 as well as FIG. 1 through FIG. 8, there is shown generally the steps of generating a notification to a subsystem based on tuple creation as described in conjunction with FIG. 6 above, based on tuple deletion as described in conjunction with FIG. 7 above, and based on tuple change or update as described in conjunction with FIG. 8 above.

At step 560, the sysDB 26 determines the type of notification to be carried out. As noted previously, a notification will be generated when a tuple is created, deleted or changed. Other events for triggering notification may also be used in conjunction with the present invention including, for example, during a revert sequence where previous changes to a tuple are reverted. Step 570 is then carried out.

At step 570, the sysDB 26 begins iteration at the affected tuple by providing a current tuple pointer to this affected tuple. The affected tuple is the tuple that was created, deleted or changed according to the steps as outline in FIG. 6, FIG. 7, and FIG. 8 respectively. Step 580 is then carried out.

At step 580, the sysDB 26 determines whether the current tuple has registration for notification. If any subsystems have registered for notification with the affected tuple, then step 590 is carried out. Otherwise step 600 is carried out.

At step 590, the sysDB 26 transmits a notification message to the subsystems registered for notification with the current tuple of step 580. The notification message indicates the type of transaction (create, delete, or change) that occurred at the tuple and the current configuration value of the tuple, if any. Step 600 is then carried out.

At step 600, the sysDB 26 determines whether the current tuple has its "parent has sub-tree notification" flag set. This flag will be set if a subsystem has registered for notification at a parent level for changes made at the current level as described above in conjunction with FIG. 4. If the "parent has sub-tree notification" flag is set at the current tuple, step 620 is carried out. Otherwise, the notification process is complete and step 610 is carried out.

At step 610, the notification process is completed. Any variables or functions created during the notification process are destroyed or otherwise purged.

At step 620, the sysDB 26 iterates to the parent node of the current tuple, to thereby ascertain subsystems, if any, registered for notification at the parent tuple. It will be appreciated that when carrying out the notification sequence, described in step 590, the present invention notifies such registered subsystems of the changes made during step 540 of FIG. 8. Step 630 is then carried out.

At step 630, the sysDB 26 determines whether the tuple iterated to in step 620 is the root (cfg) 43 of the sysDB tree 42. Generally, notification registrations are not carried out at the root node. If the currently iterated tuple is the root (cfg) 43 of the sysDB tree 42, step 640 is carried out to complete the notification process. Otherwise step 580 is repeated again to provide notification at newly iterated tuple.

At step 640, the notification process is completed. Any variables or functions created during the notification process are destroyed or otherwise purged.

Accordingly, it will be seen that this invention provides a method for carrying out router configuration change notifications using a centralized database. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A product for providing a configuration database subsystem that maintains configuration data for objects in a network for a router device comprising:

instructions for directing a processing unit in said router device to:

maintain a configuration database;

receive a notification request sent from one of a plurality of subsystems in said router device, wherein said notification request is a request to receive notification of changes to configuration data of an object in said network identified in said notification request and wherein each of said plurality of subsystems is instructions executed by said processing unit to provide an application of an internetwork operating system;

store an identification of said one of said plurality of subsystems that transmitted said notification request in a record in said database that stores said configuration data for said object identified in said notification request wherein said identification identifies said one of said plurality of subsystems as a subsystem to notify in response to a change in said configuration data for said object in said record;

set a notification flag in said record wherein said notification flag indicates that a notification must be sent responsive to a change;

receive a change in said configuration data of said object;

retrieve said record that stores said configuration data for said object;

read said notification flag;

determine whether said notification flag is set;

read said identification of said one of said plurality of subsystems from said record that stores said configuration data for said object to receive said change in said configuration data responsive to a determination that said notification flag is set; and transmit a notification of said change of configuration data of said object to said one of said plurality of subsystems responsive to said reading of said identification; and a media readable by said processing unit that stores said instructions.

2. The product of claim 1 wherein said instructions further comprise:

instructions for directing said processing unit to:

determine said notification request is configuration data of a name space;

retrieve each child record of said record; and set a notification flag in each said child record.

3. The product of said claim 2 wherein said instructions further comprise:

instructions for directing said processing unit to:

receive a change to configuration in a child record;

retrieve said child record responsive to receiving said change;

read said notification flag in said child record responsive to retrieving said record;

read a parent record of said child responsive to reading said notification flag; and transmit notification of said change of change to said one of said plurality of subsystems identified in said parent record.

4. The product of claim 1 wherein said instructions further comprise:

instructions for directing said processing unit to:

receive a remove notification request from said one of said plurality of subsystems, wherein said remove notification request is a request to remove said one of said plurality of subsystems from said plurality of subsystems to be notified in response to a change in said configuration data; and remove said identification of said one of said plurality of subsystems from said record of said configuration data storing subsystems to be notified of a change in said configuration data.

5. The product of claim 4 wherein said instructions further comprise:

instructions for directing said processing unit to:

determine whether said configuration data for which said remove notification request is for a name space;

retrieve each child record of said record of said configuration data responsive to a determination said configuration data is a name space; and remove a notification flag from each said child record.

6. A computer-implemented method for providing a configuration database subsystem that maintains configuration data for objects in a network for a router device comprising:

maintaining a configuration database;

receiving a notification request sent from one of a plurality of subsystems in said router device, wherein said notification request is a request to receive notification of changes to configuration data of an object in said network identified in said notification request and wherein each of said plurality of subsystems is instructions executed by a processing unit in said router to provide an application of an internet work operating system;

storing an identification of said one of said plurality of subsystems that transmitted said notification request in a record in said database that stores said configuration data for said object identified in said notification request wherein said identification identifies said one of said plurality of subsystems as a subsystem to notify in response to a change in said configuration data for said object in said record;

setting a notification flag in said record wherein said notification flag indicates that notification is required responsive to a change;

receiving a change in said configuration data of said object;

retrieving said record that stores said configuration data for said object;

reading said notification flag;

determining whether said notification flag is set;

reading said identification of said one of said plurality of subsystems from said record that stores said configuration data for said object to receive said change in said configuration data responsive to a determination that said notification flag is set; and transmitting a notification of said change of configuration data of said object to said one of said plurality of subsystems responsive to said reading of said identification.

7. The method of claim 6 further comprising:

determining said notification request is configuration data of a name space;

retrieving each child record of said record; and setting a notification flag in each said child record.

8. The method of claim 7 further comprising:

receiving a change to configuration in a child record;

retrieving said child record responsive to receiving said change;

reading said notification flag in said child record responsive to retrieving said record;

reading a parent record of said child responsive to reading said notification flag; and transmitting notification of said change of said change to said one of said plurality of subsystems identified in said parent record.

9. The method of claim 6 further comprising:

receiving a remove notification request from said one of said plurality of subsystems, wherein said remove notification request is a request to remove said one of said plurality of subsystems from said plurality of subsystems to be notified in response to a change in said configuration data; and removing said identification of said one of said plurality of subsystems from said record of said configuration data storing subsystems to be notified of a change in said configuration data.

10. The method of claim 9 further comprising:

determining whether said configuration data for which said remove notification request is for a name space;

retrieving each child record of said record of said configuration data responsive to a determination said configuration data is a name space; and removing a notification flag from each said child record.

\* \* \* \* \*